US 8,019,214 B2

(12) United States Patent
Hwang

(10) Patent No.: US 8,019,214 B2
(45) Date of Patent: Sep. 13, 2011

(54) CAMERA ACCESSORY COUPLING APPARATUS

(75) Inventor: Chi-hun Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 12/635,781

(22) Filed: Dec. 11, 2009

(65) Prior Publication Data

US 2010/0166418 A1    Jul. 1, 2010

(30) Foreign Application Priority Data

Dec. 26, 2008    (KR) .................. 10-2008-0134960

(51) Int. Cl.
    *G03B 15/03*    (2006.01)
(52) U.S. Cl. ........................ 396/198; 396/544
(58) Field of Classification Search .................. 396/198, 396/544
    See application file for complete search history.

(56) References Cited

U.S. PATENT DOCUMENTS

2009/0169199 A1* 7/2009 Takano .................. 396/544

FOREIGN PATENT DOCUMENTS

| JP | 06102565 A | * | 4/1994 |
| JP | 09043683 A | * | 2/1997 |
| JP | 2001033871 A | * | 2/2001 |
| JP | 2001-264861 A | | 9/2001 |
| JP | 2008180914 A | * | 8/2008 |

* cited by examiner

*Primary Examiner* — Clayton E Laballe
*Assistant Examiner* — Leon W Rhodes
(74) *Attorney, Agent, or Firm* — Drinker Biddle & Reath LLP

(57) ABSTRACT

A camera accessory coupling apparatus capable of easily and quickly coupling a camera body to a camera accessory is provided. The camera accessory coupling apparatus includes a holder selectively detachable from the camera body; a locking pin, disposed in the holder, a portion of which may enter the holder or exit from the holder; an elastic member contacting the locking pin and applying an elastic force to the locking pin; and a locking lever coupled with the holder and selectively contactable with the elastic member to control the entering and exiting of the locking pin with respect to the holder.

19 Claims, 9 Drawing Sheets

CAMERA ACCESSORY COUPLING APPARATUS

CROSS-REFERENCE TO RELATED PATENT APPLICATION

This application claims the benefit of Korean Patent Application No. 10-2008-0134960, filed on Dec. 26, 2008, in the Korean Intellectual Property Office, the disclosure of which is incorporated herein in its entirety by reference.

BACKGROUND

The present invention relates to a camera accessory coupling apparatus, and more particularly, to a camera accessory coupling apparatus capable of easily and quickly coupling a camera body to a camera accessory.

Digital Single Lens Reflex (DSLR) cameras capable of taking professional quality pictures have become widely popular. DSLR denotes a technique of sending an image of an object to a view finder via a single lens and sending light to a sensor which captures the image via the single lens. Distribution-type digital cameras, which are frequently used, are Twin Lens Reflex (TLR) cameras. Thus, distribution-type digital cameras are able to take pictures while checking an image transmitted to a sensor through a display unit, because a subject image transmitted to a sensor is different from a subject image seen from a viewfinder.

In conventional DSLR cameras, a mirror is formed on an optical axis of a lens unit so as to rotate within a predetermined angle about the optical axis. In normal situations, object light obtained by the lens unit is reflected by the mirror, an object image is formed on a focus plate, and a photographer can check the object image formed on the focus plate via a penta prism and a view finder. At this time, when a shutter-release signal is input, the mirror rotates within a predetermined range about the optical axis of the lens unit and swings upward in order to be withdrawn from the optical axis of the lens unit. When a shutter is opened under the control of a shutter driving circuit, the object image is formed on an imaging device.

Such conventional DSLR cameras may further include a strobe which is a strong light source that emits light simultaneously when a shutter emits light, in order to compensate for the deficiency of light while a photographing operation is being performed. The strobe, which uses spontaneous flashes, uses light which is generated by electrical stimulation caused by spontaneous flow of a high-voltage direct current within a discharge pipe filled with a xenon (Xe) gas or the like. Since photography is performed by such synchronization between the strobe and the camera, consistent brightness and a consistent light quality can be obtained. Small strobes are highly portable and can be used to photograph a fast-moving object even in dark places.

Strobes may be classified into portable small strobes, middle-sized strobes, and studio large strobes according to their sizes and capacities. According to installation methods, strobes may also be classified into clip-on type strobes capable of being detached from a hot shoe of a camera, and grip type strobes which are used by being connected to a synchronization contact of a camera by using a grip.

In clip-on type strobes, in order to connect a camera body with a strobe, a hot shoe having a fixed terminal to which a strobe terminal can be attached is generally included in the camera body. In other words, a hot shoe that allows a terminal assembly unit of the strobe to be fitted onto the upper surface of the camera body so that the strobe can be attached to the camera body is included in the camera body.

In order to couple a strobe to a camera body as described above, coupling apparatuses such as screw type coupling apparatuses, helical type coupling apparatuses, etc. have been used in the conventional art. However, these conventional coupling apparatuses have complicated structures, are difficult to manipulate, are likely to not function properly, and it takes a long time to couple a strobe to a camera body. Moreover, these conventional coupling apparatuses provide such a weak coupling force that the strobe may become detached from the camera body.

SUMMARY

The present invention provides a camera accessory coupling apparatus having a simple structure which allows easy and quick coupling of a camera body to a camera accessory.

According to an aspect of the present invention, there is provided a camera accessory coupling apparatus for coupling a camera body to a camera accessory, the camera accessory coupling apparatus including a holder that is detachable from the camera body; a locking pin disposed in the holder that can enter and exit the holder; an elastic member contacting the locking pin and applying an elastic force to the locking pin; and a locking lever coupled with the holder that is contactable with the elastic member to control the entering and exiting of the locking pin with respect to the holder.

When the locking lever rotates in one direction along an outer circumference of the holder and presses down the elastic member, a portion of the locking pin may exit from the holder. When the locking lever rotates in an opposite direction along the outer circumference of the holder, the locking lever may be separated from the elastic member, and thus the portion of the locking pin may reenter the holder.

When the locking lever rotates in the one direction and the portion of the locking pin exits from the holder, the locking lever may contact a depressed portion of an upper surface of the holder. When the locking lever rotates in the direction opposite to the one direction and the locking pin enters the holder, the locking lever may be separated from the depressed portion of the upper surface of the holder.

The locking lever may move in a direction parallel to a rotational axis of the locking lever while rotating along the outer circumference of the holder.

The locking lever may be substantially ring-shaped, and an elastic member pressing unit may protrude from an upper surface of the locking lever.

When the locking lever rotates in the one direction along the outer circumference of the holder, the elastic member pressing unit of the locking lever may press down the elastic member, and the elastic member may press down the locking pin causing a portion of the locking pin to exit from the holder.

A groove may be formed on an upper surface of the holder, and a part of the groove may be inclined. When the locking lever is rotated, the locking lever may be slidable on the inclined surface of the groove.

When the locking lever rotates, the elastic member pressing unit of the locking lever may move along the inclined surface of the holder.

One end of the elastic member may be a fixed end, and the other end of the elastic member may be a free end. The free end of the elastic member may be contactable with the locking pin.

The elastic member may be inclined at an angle with a plane perpendicular to a rotational axis of the locking lever.

A housing on which the camera accessory is seated may be disposed on the upper surface of the holder, and an inner circumference of the housing may include inclined portions.

The locking lever may further include guide units for guiding a rotation path of the locking lever. When the locking lever rotates, the guide units of the locking lever may move along the inclined portions of the housing.

The camera accessory coupling apparatus may further include a locking pin spring for providing elasticity to the locking pin in a direction in which the locking pin exits from the holder.

The camera accessory coupling apparatus may be coupled to a hot shoe formed on the camera body.

The camera accessory may be a strobe.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described in detail by explaining preferred embodiments of the invention with reference to the attached drawings.

Figure 1:
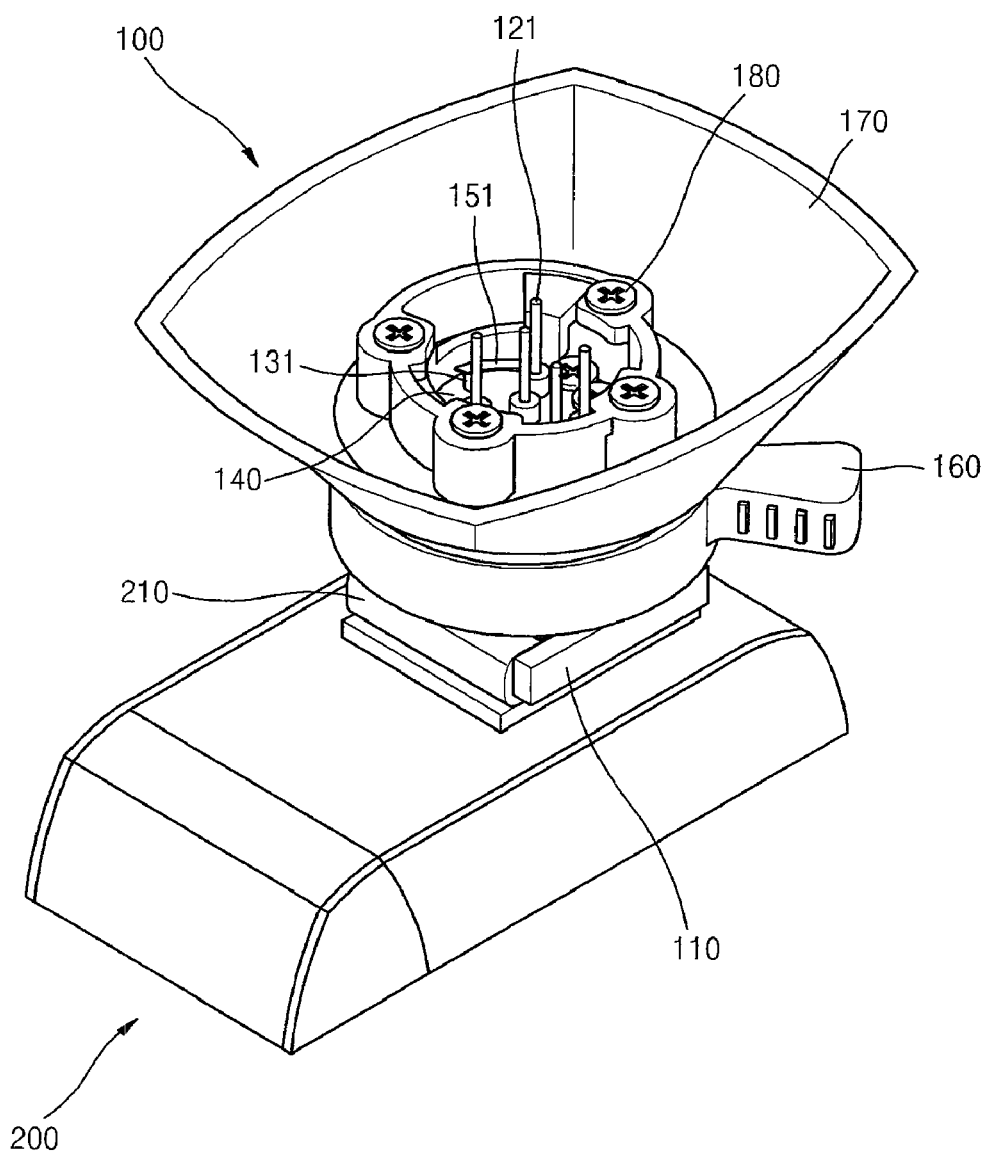
FIG. 1 is a perspective view of a camera accessory coupling apparatus according to an embodiment of the present invention.
Figure 2:
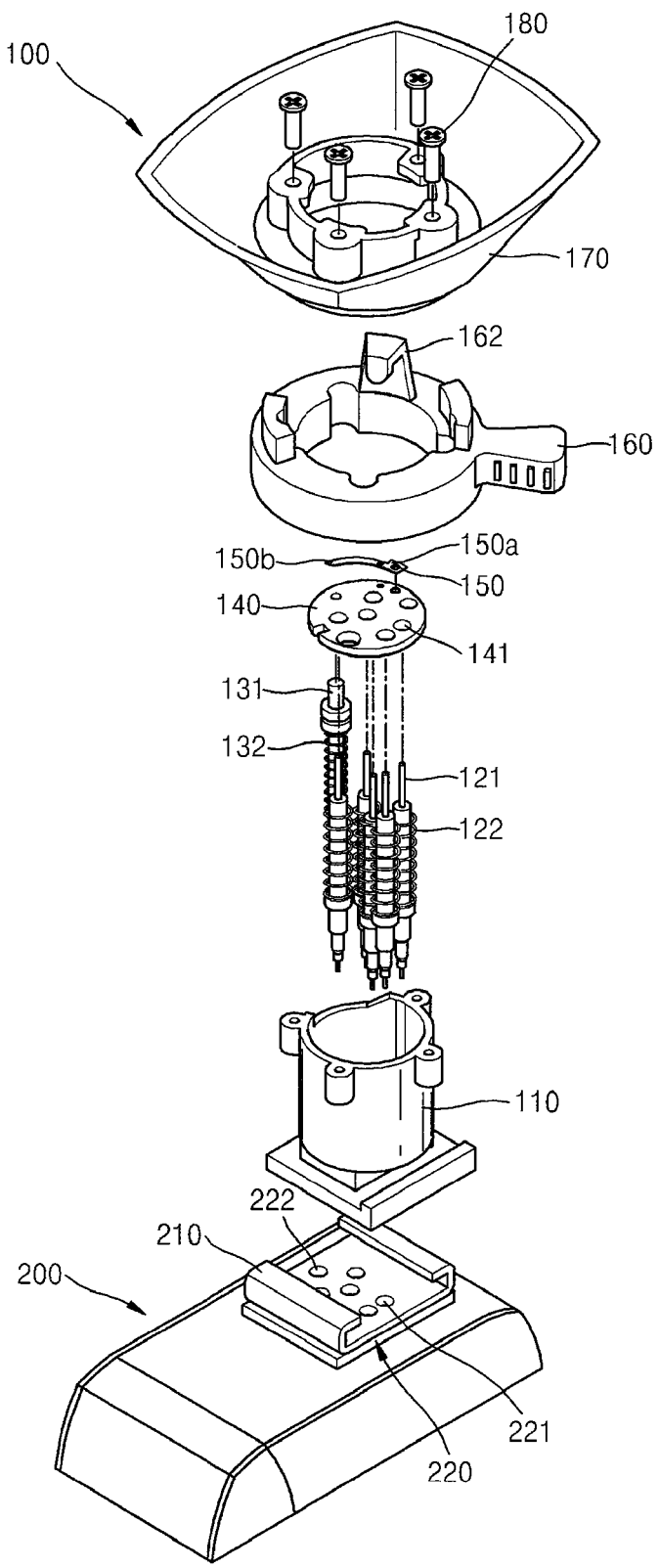
FIG. 2 is an exploded perspective view of the camera accessory coupling apparatus illustrated in FIG. 1.

FIG. 1 is a perspective view of a camera accessory coupling apparatus 100 according to an embodiment of the present invention. FIG. 2 is an exploded perspective view of the camera accessory coupling apparatus 100 illustrated in FIG. 1.

Referring to FIGS. 1 and 2, the camera accessory coupling apparatus 100 includes a holder 110, data pins 121, data pin springs 122, a locking pin 131, a locking pin spring 132, a pin guide plate 140, an elastic member 150, a locking lever 160, a strobe housing 170, and coupling members 180. The camera accessory coupling apparatus 100 is coupled with coupling units 210 of a camera body 200, thus connecting to a hot shoe 220.

A hot shoe (i.e., a cordless contact shoe) denotes a part in which a direct-coupling contact for strobes is installed, within an accessory shoe of a camera. Also, products have been recently developed, which are capable of not only performing photography using synchronization between a strobe and a camera but also performing a high-degree information exchange, such as, automatic control of the light amount of the strobe by using information about a camera received by the strobe, or control of the aperture of a shutter by using a charge state or the like of the strobe received by the camera.

However, conventional coupling apparatuses used to couple a strobe to a hot shoe of a camera body have complicated structures, are difficult to manipulate, take a long time to couple the strobe to the camera body, and provide such a weak coupling force that the strobe may become uncoupled from the camera body.

To address this problem, the camera accessory coupling apparatus 100 provides a simple coupling structure for coupling the camera body 200 to a strobe (not shown).

First, the hot shoe 220 is formed on the camera body 200. The hot shoe 220 includes data pin holes 221 into which the data pins 121 of the camera accessory coupling apparatus 100 are inserted, and a locking pin hole 222 into which the locking pin 131 of the camera accessory coupling apparatus 100 is inserted. The coupling units 210 onto which the holder 110 of the camera accessory coupling apparatus 100 is fitted are formed on both sides of the hot shoe 220.

The data pins 121 are disposed within the holder 110. The data pins 121 are inserted into the data pin holes 221 of the camera body 200, and thus data transmission and reception between the camera body 200 and the strobe is performed. At this time, the data pin springs 122 are fitted onto the data pins 121. The data pin springs 122 provide predetermined elasticity to the data pins 121 so that the data pins 121 protrude from a bottom of the holder 110, that is, protrude toward the camera body 200 as viewed from FIG. 2. Thus, in normal situations, the data pins 121 maintain their state of protrusion from the bottom of the holder 110. When the camera accessory coupling apparatus 100 is fitted onto the camera body 200, the data pins 121 are inserted into the data pin holes 221 by the elasticity provided by the data pin springs 122.

Although five data pins 121 and five data pin springs 122 are illustrated in FIGS. 1 and 2, the present invention is not limited thereto, and the numbers and shapes of data pins 121 and data pin springs 122 may vary according to the specifications of the camera body 200 and the strobe.

The locking pin 131 may also be disposed within the holder 110. The locking pin 131 is inserted into the locking pin hole 222 of the camera body 200 when the camera body 200 has been coupled to the camera accessory coupling apparatus 100, thereby maintaining the coupling of the camera body 200 with the camera accessory coupling apparatus 100. Here, the locking pin spring 132 is fitted onto the locking pin 131. The locking pin spring 132 provides predetermined elasticity to the locking pin 131 so that the locking pin 131 protrudes from a top of the holder 110 as shown in FIG. 1. Thus, in normal situations, an upper end of the locking pin 131 partially protrudes from a top of the pin guide plate 140 which will be described later. In this state, when the locking lever 160 and the elastic member 150, which will be described later, press down the locking pin 131, the locking pin 131 is pushed down and thus a lower end of the locking pin 131 protrudes from the bottom of the holder 110 and is inserted into the locking pin hole 222. When the locking lever 160 and the elastic member 150 stop pressing down the locking pin 131, the locking pin 131 is returned to the original position by the elasticity provided by the locking pin spring 132. A mechanism of operating the locking pin 131 will be described in detail later.

The pin guide plate 140 is disposed within the holder 110. The pin guide plate 140 may have a disk shape and is fixed within the holder 110. The pin guide plate 140 includes a plurality of holes 141 formed so as to face the data pins 121 and the locking pin 131. Thus, while the pin guide plate 140 is being coupled with the holder 110, the data pins 121 and the locking pin 131 are fitted into the holes 141, and vertical movement of the data pins 121 and the locking pin 131 is guided by the pin guide plate 140.

The elastic member 150 is installed on the pin guide plate 140. The elastic member 150 may be a leaf spring. One end 150a of the elastic member 150, serving as a fixed end, is fixed to the pin guide plate 140. The other end 150b of the elastic member 150, serving as a free end, is inclined at an angle with respect to the pin guide plate 140. The end 150b of the elastic member 150 is formed so as to contact the upper end of the locking pin 131. Since the end 150b of the elastic member 150 is inclined at an angle, the end 150b is separated from the locking pin 131 in normal situations. However, when the locking lever 160 rotates and presses the end 150b, the end 150b presses the locking pin 131 while contacting the locking pin 131, and thus the locking pin 131 is pushed downward and the lower end of the locking pin 131 protrudes from the holder 110 and is inserted into the locking pin hole 222.

The locking lever 160 is fitted onto an outer circumference of the holder 110 so as to rotate about the holder 110. When the locking lever 160 rotates in one direction, an elastic member pressing unit 162 of the locking lever 160 presses down the elastic member 150, and the elastic member 150 presses down the locking pin 131. Thus, the lower end of the locking pin 131 is inserted into the locking pin hole 222, and thus the camera accessory coupling apparatus 100 is coupled with the camera body 200. On the other hand, when the locking lever 160 rotates in an opposite direction, the elastic member pressing unit 162 of the locking lever 160 is separated from the elastic member 150, and thus a pressure of the elastic member 150 applied to the locking pin 131 is removed. Thus, the lower end of the locking pin 131 enters the holder 110, and thus the camera accessory coupling apparatus 100 is uncoupled from the camera body 200.

Components of the camera accessory coupling apparatus 100 and relations between the components will now be described in greater detail.

Figure 3:
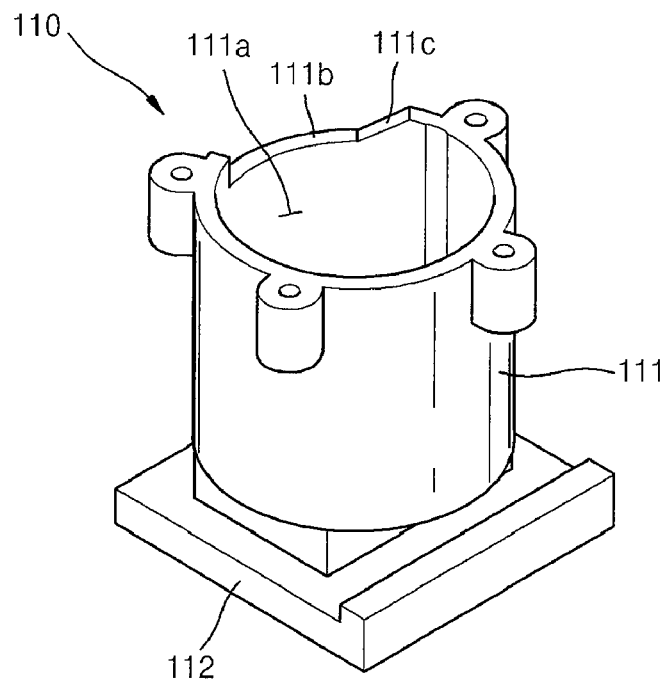
FIG. 3 is a perspective view of a holder of the camera accessory coupling apparatus illustrated in FIG. 1.
Figure 4:
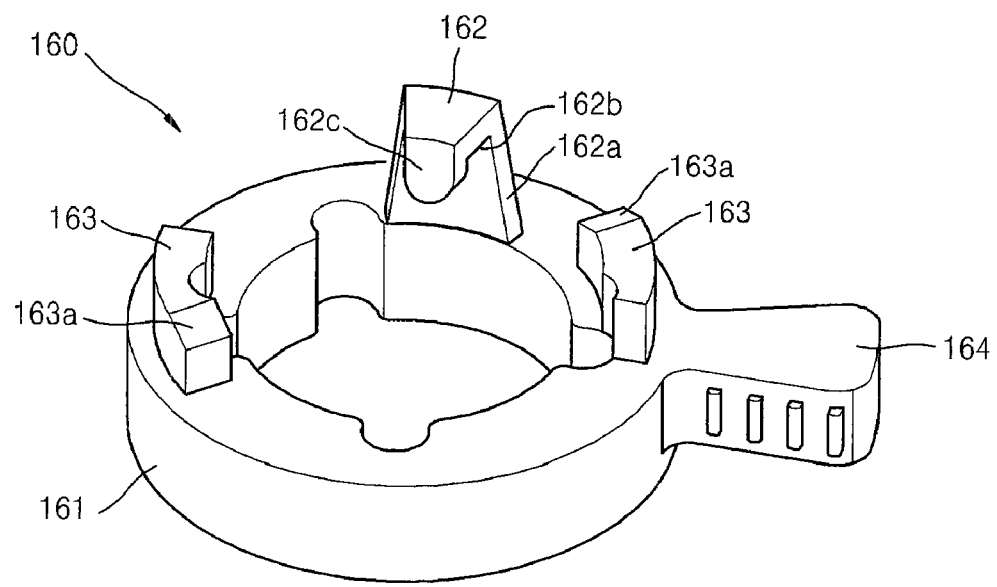
FIG. 4 is a perspective view of a locking lever of the camera accessory coupling apparatus illustrated in FIG. 1.
Figure 5:
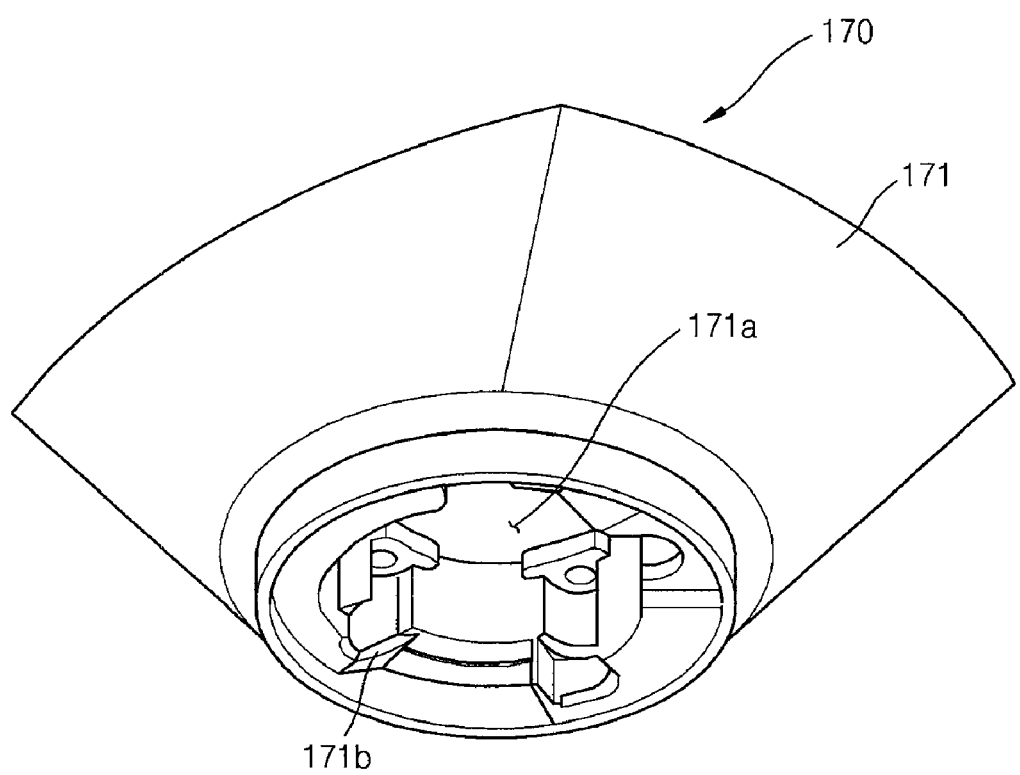
FIG. 5 is a perspective view of a strobe housing of the camera accessory coupling apparatus illustrated in FIG. 1.

FIG. 3 is a perspective view of the holder 110 of the camera accessory coupling apparatus 100 illustrated in FIG. 1. FIG. 4 is a perspective view of the locking lever 160 of the camera accessory coupling apparatus 100 illustrated in FIG. 1. FIG. 5 is a perspective view of the strobe housing 170 of the camera accessory coupling apparatus 100 illustrated in FIG. 1.

As illustrated in FIG. 3, the holder 110 includes a cylindrical main body 111 which is hollow, and a hot shoe coupling unit 112 formed under the cylindrical main body 111 and fitted onto the coupling units 210 of the camera body 200 of FIG. 2.

A hollow space 111a is formed within the cylindrical main body 111. A depression 111b is formed in a part of the upper surface of the cylindrical main body 111. An inclination 111c is formed on one side of the depression 111b. A groove 162b (see FIG. 4) of the elastic member pressing unit 162 of the locking lever 160 is fitted onto the depression 111b. Thus, when the locking lever 160 rotates, the groove 162b of the locking lever 160 slides along the depression 111b and the inclination 111c of the holder 110. Thus, when the groove 162b of the locking lever 160 slides along the inclination 111c of the holder 110, the locking lever 160 is moved up and down with respect to the holder 110.

Although not shown in FIG. 3, the hot shoe coupling unit 112 includes holes into which the data pins 121 of FIG. 2 and the locking pin 131 of FIG. 2 can be inserted. The data pins 121 and the locking pin 131 may be withdrawn from the holder 110 via the holes or enter the holder 110 via the holes.

As illustrated in FIG. 4, the locking lever 160 includes a base 161, the elastic member pressing unit 162, guide units 163, and a grip 164.

The base 161 may have a quasi-ring shape. An inner diameter of the locking lever 160 may be slightly greater than an outer diameter of the holder 110 so that the locking lever 160 may be fitted onto the outer circumference of the holder 110. The grip 164 protrudes from one side of the base 161 so that users can rotate the locking lever 160.

The elastic member pressing unit 162 is formed on the base 161. The elastic member pressing unit 162 is bent to have a quasi-inverted U (∩) shape. In other words, a protrusion 162a protrudes from the upper surface of the base 161, one end of the protrusion 162a is bent about 90° twice to thereby form a pressing portion 162c and the groove 162b. Groove 162b is disposed between the protrusion 162a and the pressing portion 162c. The pressing portion 162c functions to press down the elastic member 150. In other words, when the locking lever 160 is rotating about the holder 110, the pressing portion 162c presses down the elastic member 150.

As described above, the groove 162b is fitted onto the depression 111b of the holder 110. Thus, when the locking lever 160 rotates, the groove 162b of the locking lever 160 slides along the depression 111b and the inclination 111c of the holder 110. Thus, when the groove 162b of the locking lever 160 slides along the inclination 111c of the holder 110, the locking lever 160 moves up and down with respect to the holder 110. By the vertical movement of the locking lever 160 with respect to the holder 110 as described above, the pressing portion 162c may press down the elastic member 150 or may be separated from the elastic member 150.

Guide units 163 are formed on the base 161. The guide units 163 protrude from the upper surface of the base 161, and an inclination 163a is formed on one side of each of the guide units 163. The inclinations 163a contact inclinations 171b (see FIG. 5) of the strobe housing 170 which will be described later. Thus, when the locking lever 160 rotates, the inclinations 163a of the locking lever 160 slide along the inclinations 171b of the strobe housing 170. Thus, when the inclinations 163a of the locking lever 160 slide along the inclinations 171b of the strobe housing 170, the locking lever 160 moves up and down with respect to the strobe housing 170.

As illustrated in FIG. 5, the strobe housing 170 includes a body 171 on which the strobe (not shown) is seated. The body 171 is shaped like a triangular pyramid in which a hollow space 171a is formed, and includes the inclinations 171b formed on an inner circumference of the body 171. As described above, the inclinations 171b contact the inclinations 163a of the locking lever 160, and thus when the locking lever 160 rotates, the inclinations 163a of the locking lever 160 slide along the inclinations 171b of the strobe housing 170. Thus, the locking lever 160 moves up and down with respect to the strobe housing 170.

Coupling and uncoupling between the camera accessory coupling apparatus 100 and the hot shoe 220 of the camera body 200 will now be described in detail.

Figure 6:
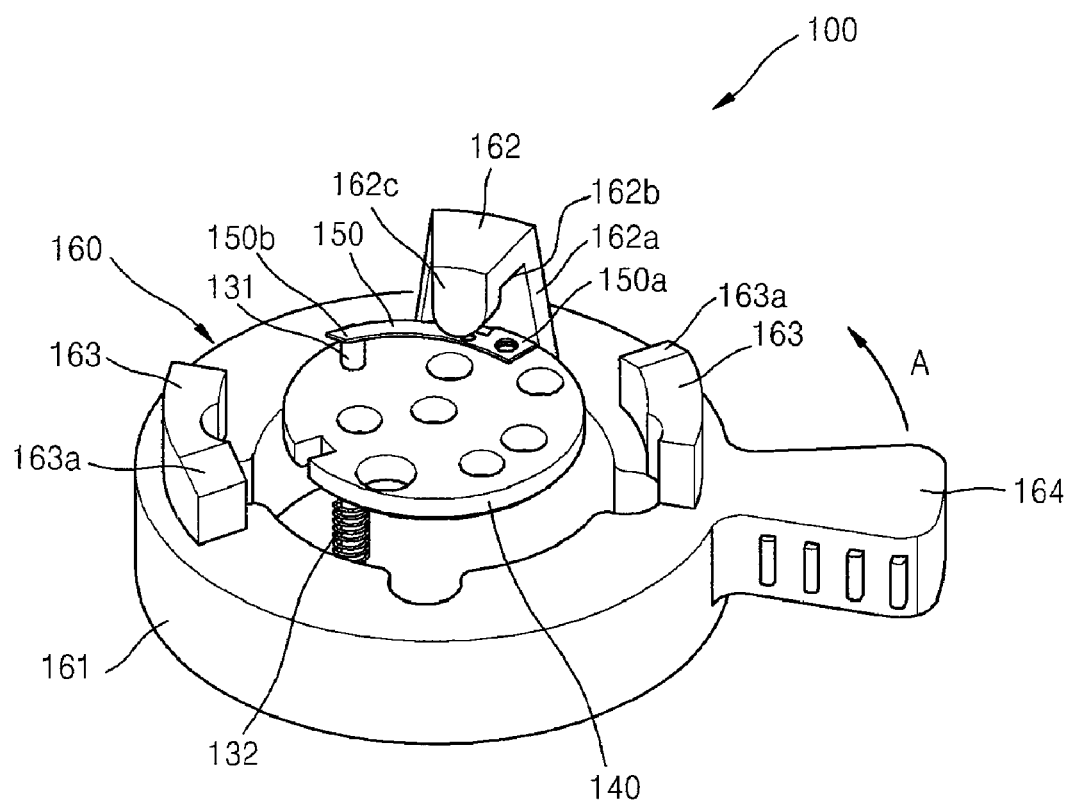
FIG. 6 is a perspective view illustrating a relationship between the locking lever, a locking pin, a pin guide plate, and an elastic member of the camera accessory coupling apparatus illustrated in FIG. 1.
Figure 7:
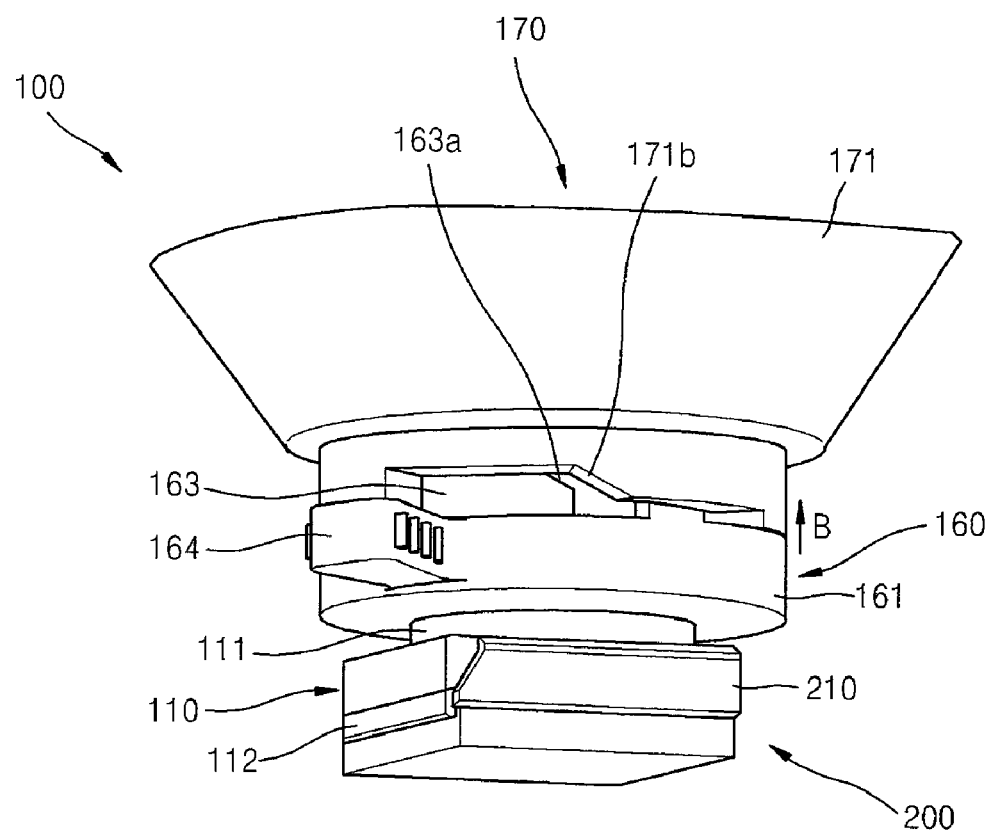
FIGS. 7 and 8 illustrate the camera accessory coupling apparatus illustrated in FIG. 1 which is uncoupled from a hot shoe of a camera body.
Figure 8:
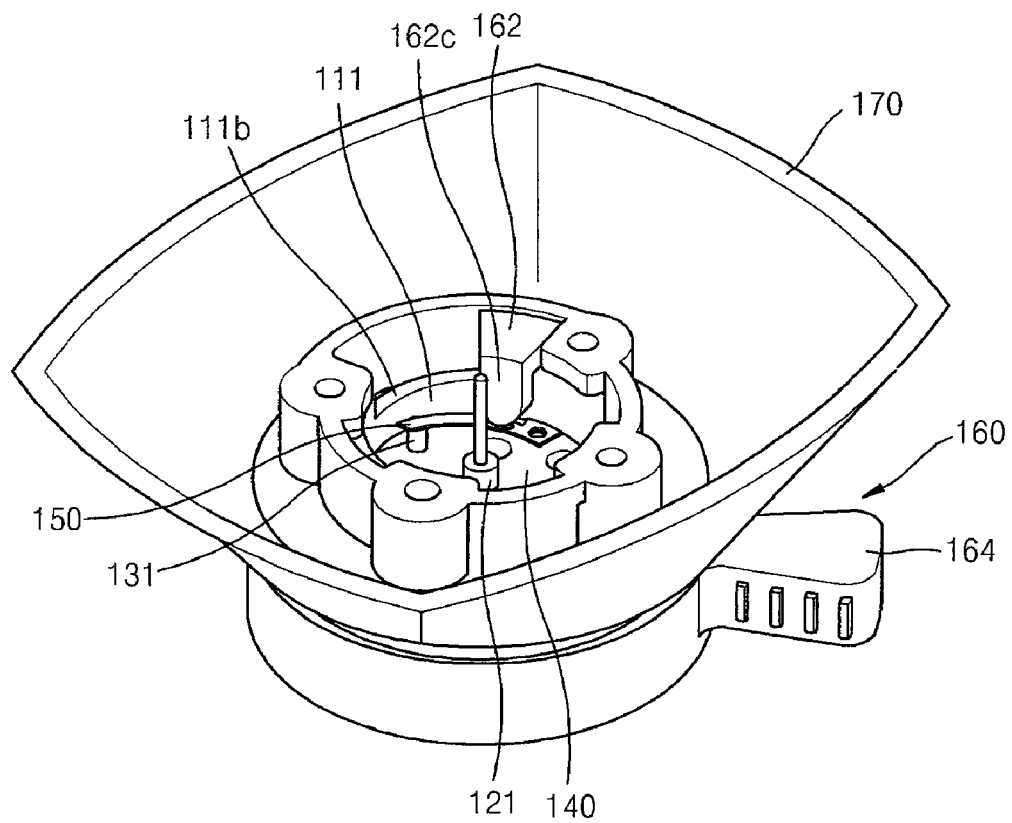
Figure 9:
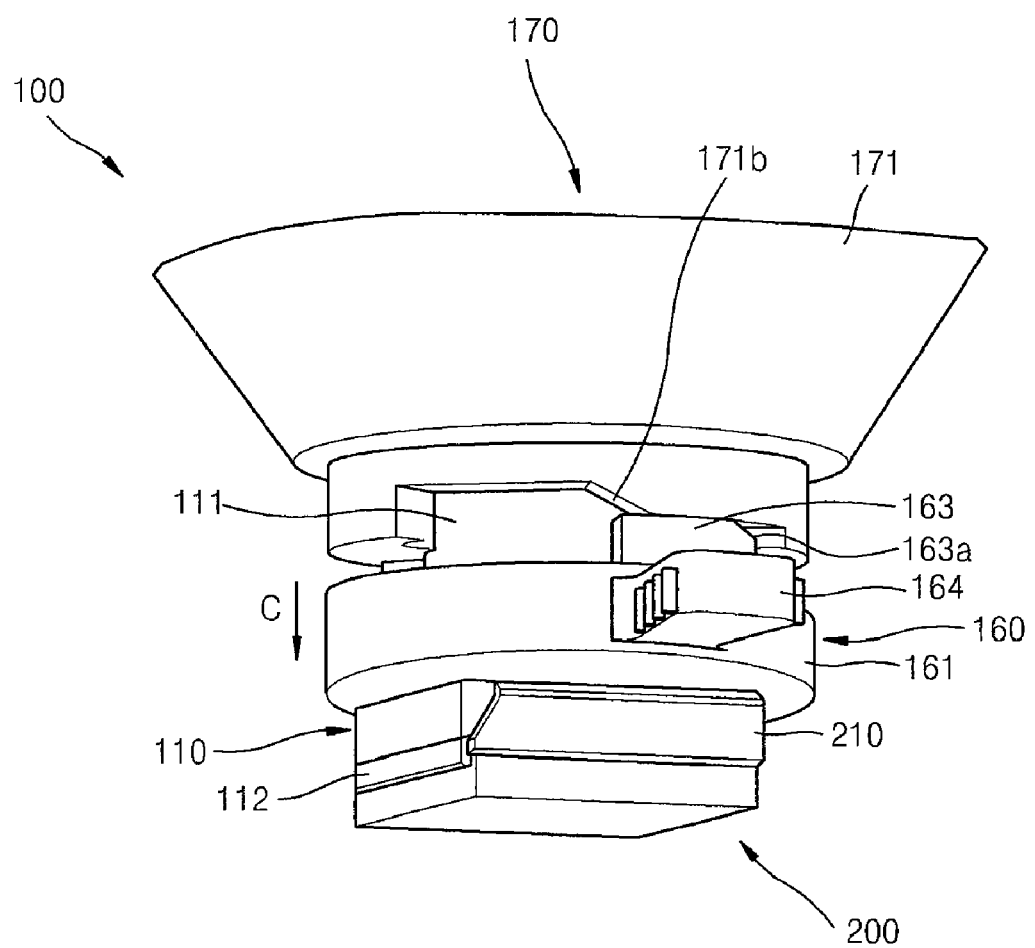
FIGS. 9 and 10 illustrate the camera accessory coupling apparatus illustrated in FIG. 1 which is coupled to the hot shoe of the camera body.
Figure 10:
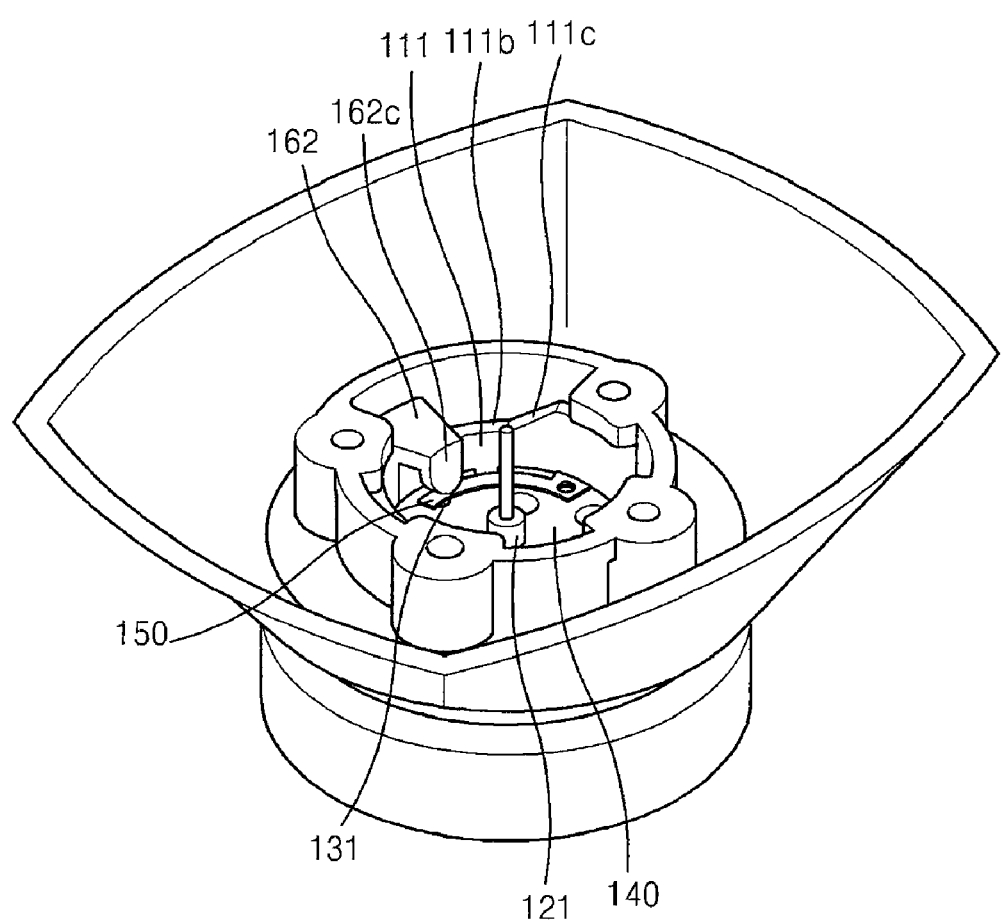

FIG. 6 is a perspective view illustrating a relationship between the locking lever 160, the locking pin 131, the pin guide plate 140, and the elastic member 150 of the camera accessory coupling apparatus 100 illustrated in FIG. 1. FIG. 6 does not illustrate the holder 110, that is, the holder 110 that is interposed between the locking lever 160 and the pin guide plate 140. FIGS. 7 and 8 illustrate the camera accessory coupling apparatus 100 which is uncoupled from the hot shoe 220 of the camera body 200. FIGS. 9 and 10 illustrate the camera accessory coupling apparatus 100 which is coupled to the hot shoe 220 of the camera body 200. In FIGS. 7 and 9, a part of the outer circumference of the strobe housing 170 is cut away so that the inclinations 171b of the strobe housing 170 are exposed.

Referring to FIGS. 6, 7, and 8, when the camera accessory coupling apparatus 100 is uncoupled from the camera body 200, the elastic member pressing unit 162 of the locking lever 160 does not contact the elastic member 150, and the body 161 of the locking lever 160 contacts the body 171 of the strobe housing 170.

In this state, when the grip 164 of the locking lever 160 is moved in direction A of FIG. 6, the elastic member pressing unit 162 is rotated in direction A of FIG. 6, as illustrated in FIGS. 6, 9, and 10. At this time, as described above, the inclinations 163a of the locking lever 160 slide along the inclinations 171b of the strobe housing 170, and thus the locking lever 160 is moved downward in direction C of FIG. 9 with respect to the strobe housing 170. Since the locking lever 160 is moved down in direction C while rotating in direction A as described above, the elastic member pressing unit 162 of the locking lever 160 gradually presses down the other end 150b of the elastic member 150, and thus the locking pin 131 contacting the other end 150b of the elastic member 150 is pushed downward. Thus, the lower end of the locking pin 131 protrudes from the holder 110 and is inserted into the locking pin hole 222 of the camera body 200, and thus the camera accessory coupling apparatus 100 is coupled with the camera body 200. In this state, the locking lever 160 moves down in direction C of FIG. 9 and presses down the holder 110, and thus the holder 110 presses down the camera body 200. Therefore, the coupling between the holder 110 and the camera body 200 is reinforced.

In this state, when the grip 164 of the locking lever 160 moves in a direction opposite to direction A of FIG. 6, the elastic member pressing unit 162 is rotated in the direction opposite to direction A of FIG. 6, as illustrated in FIGS. 7 and 8. At this time, as described above, the groove 162b of the locking lever 160 slides along the depression 111b and the inclination 111c of the holder 110. When the groove 162b of the locking lever 160 slides along the inclination 111c of the holder 110, the locking lever 160 is moved up in direction B of FIG. 7 with respect to the holder 110. Since the locking lever 160 moves up in direction B while rotating in the direction opposite to direction A as described above, the elastic member pressing unit 162 of the locking lever 160 is gradually separated from the other end 150b of the elastic member 150, and thus the locking pin 131 contacting the other end 150b of the elastic member 150 is moved upward to its original position. Thus, the lower end of the locking pin 131 is separated from the locking pin hole 222 of the camera body 200 by entering the holder 110, and thus the camera accessory coupling apparatus 100 is uncoupled from the camera body 200.

According to the present invention as described above, a camera body can be easily and quickly coupled to camera accessories, the structure of a coupling apparatus is simplified, and the reliability of coupling between the camera body and a camera accessory is increased.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

What is claimed is:

1. A camera accessory coupling apparatus for coupling a camera body to a camera accessory, the camera accessory coupling apparatus comprising:
   a holder that is detachable from the camera body;
   a locking pin disposed in the holder that can enter and exit the holder;
   an elastic member contacting the locking pin and applying an elastic force to the locking pin; and
   a locking lever coupled with the holder that is contactable with the elastic member to control the entering and exiting of the locking pin with respect to the holder, wherein:
when the locking lever rotates in a first direction along an outer circumference of the holder and presses down the elastic member, a first portion of the locking pin exits from the holder; and
when the locking lever rotates in a second direction, opposite to the first direction, along the outer circumference of the holder, the locking lever is separated from the elastic member and the first portion of the locking pin enters the holder.

2. The camera accessory coupling apparatus of claim 1, wherein:
when the locking lever rotates in the first direction and the first portion of the locking pin exits from the holder, the locking lever contacts a depressed portion of an upper surface of the holder; and
when the locking lever rotates in the second direction and the first portion of the locking pin enters the holder, the locking lever is separated from the depressed portion of the upper surface of the holder.

3. The camera accessory coupling apparatus of claim 1, wherein the locking lever moves in a third direction parallel to a rotational axis of the locking lever while rotating along the outer circumference of the holder.

4. The camera accessory coupling apparatus of claim 1, wherein the locking lever is substantially ring-shaped, and an elastic member pressing unit protrudes from an upper surface of the locking lever.

5. The camera accessory coupling apparatus of claim 4, wherein when the locking lever rotates in the first direction along the outer circumference of the holder, the elastic member pressing unit of the locking lever presses down the elastic member, and the elastic member presses down the locking pin causing the first portion of the locking pin to exit from the holder.

6. The camera accessory coupling apparatus of claim 4, wherein a groove is formed on an upper surface of the holder, a part of the groove is inclined, and when the locking lever is rotated, the locking lever is slidable on the inclined surface of the groove.

7. The camera accessory coupling apparatus of claim 6, wherein when the locking lever rotates, the elastic member pressing unit of the locking lever moves along the inclined surface of the holder.

8. The camera accessory coupling apparatus of claim 1, wherein:
one end of the elastic member is a fixed end, and another end of the elastic member is a free end; and
the free end of the elastic member is contactable with the locking pin.

9. The camera accessory coupling apparatus of claim 1, wherein the elastic member is inclined at an angle with a plane perpendicular to a rotational axis of the locking lever.

10. The camera accessory coupling apparatus of claim 1, wherein a housing on which the camera accessory is seated is disposed on an upper surface of the holder, and an inner circumference of the housing includes inclined portions.

11. The camera accessory coupling apparatus of claim 10, wherein the locking lever further comprises guide units for guiding a rotation path of the locking lever, and when the locking lever rotates, the guide units of the locking lever move along the inclined portions of the housing.

12. The camera accessory coupling apparatus of claim 1 further comprising a locking pin spring providing elasticity to the locking pin in a direction in which the locking pin exits from the holder.

13. The camera accessory coupling apparatus of claim 1, wherein the camera accessory coupling apparatus is coupled to a hot shoe formed on the camera body.

14. The camera accessory coupling apparatus of claim 1, wherein the camera accessory is a strobe.

15. A method for coupling an accessory to a camera body that includes a locking pin aperture, the method comprising:
rotating a locking lever in a first direction along an outer circumference of an accessory holder disposed on the camera body, the accessory holder including a locking pin;
sliding a portion of the locking lever along a groove in an upper surface of the holder; and
pressing down an elastic member causing a first portion of the locking pin to exit from the holder and to enter the locking pin aperture of the camera.

16. The method of claim 15 further comprising moving the locking lever in a substantially vertical direction while rotating the locking lever.

17. The method of claim 15, wherein the portion of the locking lever that slides along the groove in the upper surface of the holder is an elastic member pressing unit that protrudes from an upper surface of the locking lever.

18. The method of claim 15, wherein the accessory is a strobe.

19. The method of claim 15, wherein the elastic member includes a fixed end and a free end and the method further comprises the step of contacting the locking pin with the free end of the elastic member.

* * * * *